F. K. LAWRENCE.
TIRE RACK.
APPLICATION FILED MAY 26, 1920.
1,364,442.
Patented Jan. 4, 1921.
2 SHEETS—SHEET 1.
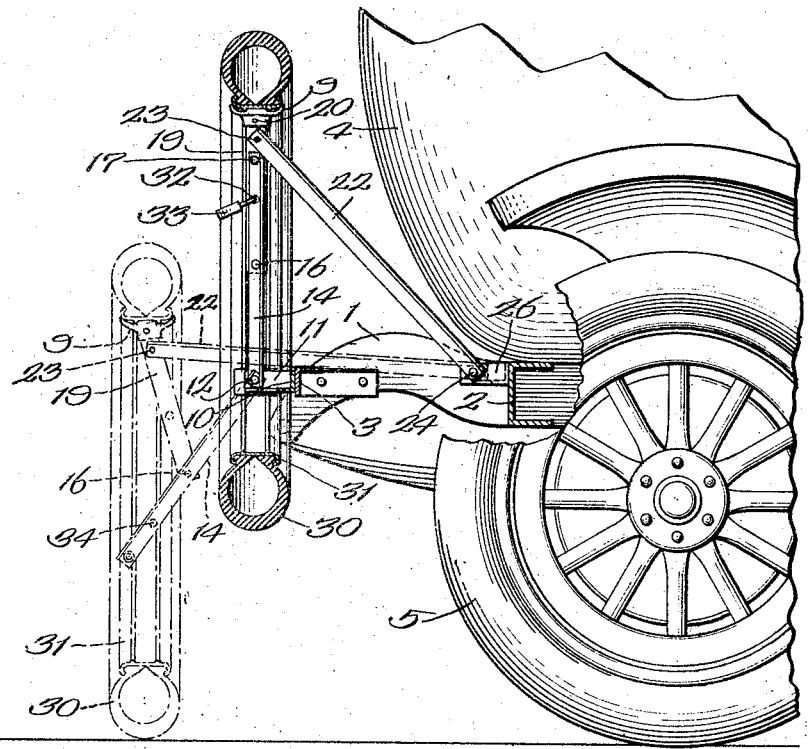
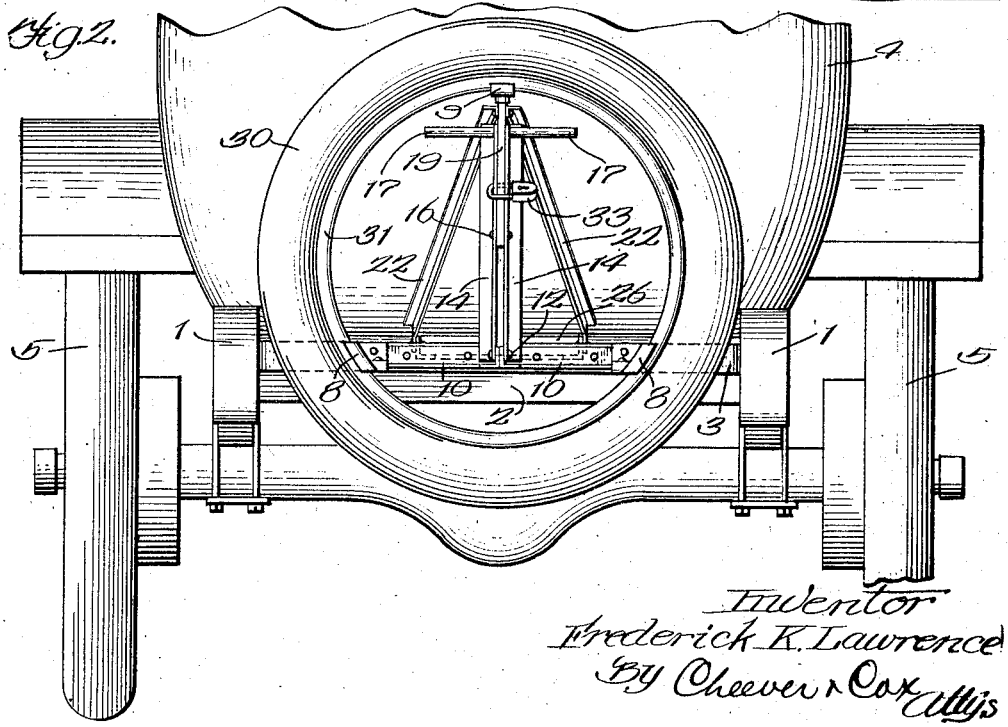
Inventor
Frederick K. Lawrence
By Cheever & Cox Attys

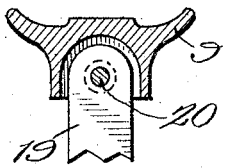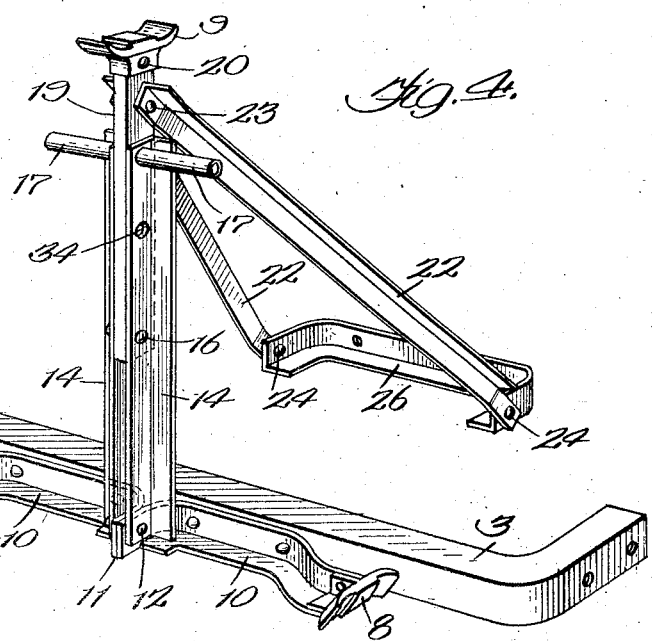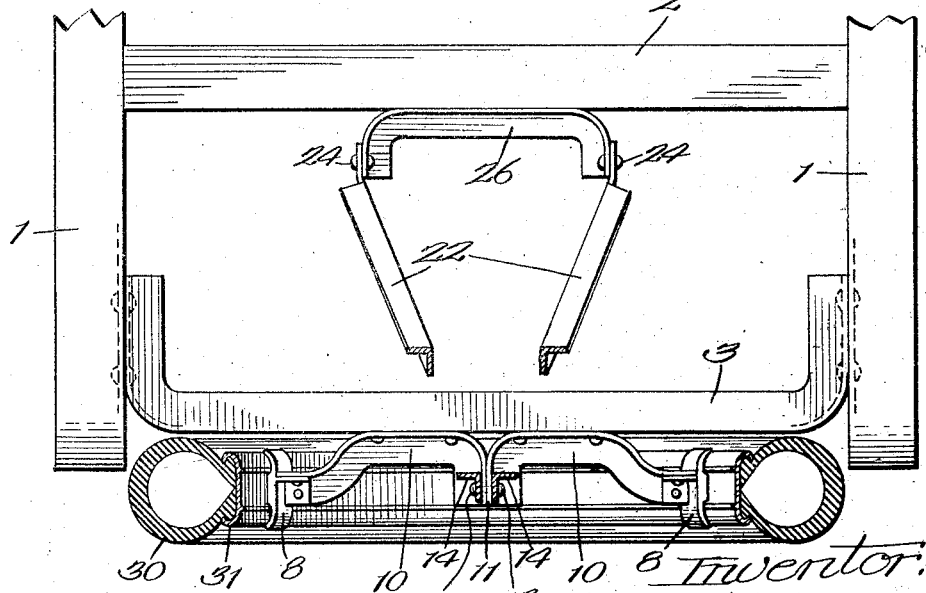

UNITED STATES PATENT OFFICE.

FREDERICK K. LAWRENCE, OF CHICAGO, ILLINOIS.

TIRE-RACK.

1,364,442.  Specification of Letters Patent.  Patented Jan. 4, 1921.

Application filed May 26, 1920. Serial No. 384,459.

*To all whom it may concern:*

Be it known that I, FREDERICK K. LAWRENCE, a citizen of the United States, residing at Chicago, in the county of Cook and State of Illinois, have invented a certain new and useful Improvement in Tire-Racks, of which the following is a specification.

My invention relates to tire racks, more particularly for carrying the spare rims and tires of motor vehicles. One of the objects of the invention is to provide a construction such that the tire may be lowered completely to the ground and released so that the operator can then roll it away without lifting it away or dragging it from a supporting portion of the rack. Another object is to provide a construction by which the tire and rim may be raised and lowered with a minimum of physical exertion on the part of the operator. Another object is to provide means whereby when the parts are in condition for travel the tire and rim may be readily and securely locked to the rack to prevent them from jarring loose and to prevent them from being stolen.

I accomplish my objects by the mechanism illustrated in the accompanying drawings in which—

Figure 1 is an assembly view from the side of the vehicle showing the device installed, Fig. 2 is an assembly drawing viewing the parts from the rear of the vehicle, Fig. 3 is a plan view showing the rear portion of the chassis of the vehicle with the tire locked in position thereon and the spare rim and tire in place, the latter being in axial section, Fig. 4 is a perspective view of the parts shown in Fig. 3 but with the rim and tire absent, and Fig. 5 is a fragmentary sectional view showing the hinge construction by which the upper rim seat is pivotally connected to its supporting link.

Like numerals denote like parts throughout the several views.

The construction of motor vehicles varies somewhat, of course, but a typical construction is shown in which the chassis has two side frame members 1, 1 and a cross frame member 2, as best shown in Fig. 3. The vehicle may have any suitable type of body 4 and wheels 5.

Referring now more particularly to the rack itself, it may be mounted on a special bar 3, provided for the purpose and fastened to the members 1, the rack having two fixed shoes or rim seats 8, 8 and one movable one 9. While the seats 8 may be secured in any suitable manner, according to the present design they are fastened to the ends of bowed angle irons 10, 10 fastened to the member 3. The inner bowed ends 11 of the bars abut each other and form a support for a pivot pin 12 which carries the hand link member. This hand link member, as illustrated, is composed of two angle irons 14, 14 spaced slightly apart and having, approximately at their mid length, a pivot pin 16. At the upper end are fastened two handle bars 17, 17 by which the hand link member may be rotated about its pivot 12.

Pivotally supported upon pin 16 is a link 19 which lies between the bars 14 and at its upper end has a pivot pin 20 upon which the upper rim seat 9 is articulately mounted. The construction is shown in detail in Fig. 5. Two bars 22, 22 are pivotally secured by a pin 23 to the upper end of link 19 just below seat 9. At their lower end they are secured by pivot pins 24, 24 to the bowed ends of an angle bar 26 rigidly fastened to the cross member 2 as shown in plan in Fig. 3 and in perspective in Fig. 4. These bars 22 functionally constitute what may be termed a "controlling link" as they confine the travel of the pivot pin 23 to the arc of the circle centered at the pins 24.

Operation: Let it be assumed that the spare tire 30, equipped with its demountable rim 31, is resting upon the ground as shown in Fig. 1. To raise the rim and tire to traveling position shown in full lines in Fig. 1 the operator lowers the handle 17 and brings the upper rim seat 9 into engagement with the rim as illustrated in dotted lines. It will be noted that when the parts are in the dotted line position the operator will obtain a good leverage for moving the link 19 upward for the reason that the lower end of the link is closer to the fulcrum pin 12 than is the handle 17. After the rim seat is adjusted to the rim the operator swings the handle upward and finally forward until the bars 14 reach vertical position, at which time the link 19 will also be vertical and the rim will be in close engagement with the lower rim seats 8. So long as the parts remain in these positions it will be impossible for the rim and tire to be removed. It will be observed that toward the later portion of the upward movement of the bars 14, as they come more nearly into line with the line 19, a true toggle action occurs. In other words, the parts 14 and 19 form two links of a toggle and of course as they straighten out they exert great upward pressure on the upper rim seat. Thus the rim may be tightly engaged. This has at least two advantages, first it prevents the rim from being forced out of engagement with the seat and second, it prevents rattling. The parts may be locked in this position by passing the bow 32 of a padlock 33 through the apertures 34 formed in the bars 14 and link 19 in line with each other as indicated in the drawing. So long as the padlock remains in position the toggle cannot be "broken" nor the link 19 lowered.

When the operator desires to lower the tire from traveling position he removes the padlock, grasps the handles and brings them toward him until the parts have reached the dotted line position shown in Fig. 1, that is, until the tire actually rests upon the ground. Of course the rim leaves the seats 8 at the beginning of the downward movement and is thereafter carried only by the upper seat 9, hence after the tire has reached the ground it may be released by simply lowering the seat 9 a little farther, sufficiently to permit the rim to clear it. It is of great advantage to be able to thus lower the tire fully to the ground for it renders it unnecessary for the operator to do any hand lifting directly on the rim or tire. A demountable rim and tire are frequently too heavy and frequently too dusty or muddy to lift conveniently and it is of great convenience to be able to lower them directly to the ground. With my device the tire can be let down, disengaged and rolled away with very little physical exertion.

Another advantage of the particular design shown is that the maximum force required of the operator is called for at a time when he is best able to exert it, that is, when the handles are nearest to the ground. This will be evident by reference to the dotted lines shown in Fig. 1. As the handles approach their uppermost position they are not in such a convenient position for lifting, and this is the time when the toggle action is most in evidence, and hence the least amount of force is required.

Having thus described my invention, what I claim as new and desire to secure by Letters Patent is:

1. In combination with a motor vehicle a tire rack having a seat for supporting the tire and means for raising and lowering the same, said means being adapted to lower the seat away from and out of engagement with the tire when the latter is supported on the ground.

2. In combination with a motor vehicle a tire rack having a plurality of seats, one of which is movable relatively to the other for bringing the tire into and out of engagement with the latter, the movable seat being adapted to descend sufficiently to disengage the tire when the latter is on the ground.

3. In combination with a motor vehicle a tire rack having a seat for supporting the tire, and a link work for raising and lowering the seat, the link work being adapted to let the tire down onto the ground and thereafter descend still farther to permit the seat to disengage the tire.

4. A tire rack adapted to be mounted on a motor vehicle and having a seat for engaging the tire and a pair of toggle links, one of which is connected to the seat and the other pivoted to a part of the vehicle, said links being approximately vertical when "straightened out," and means for rotating the last mentioned link about its axis, the toggle links being adapted to "break" far enough to cause the said seat to descend out of engagement with the tire when the latter is resting upon the ground.

5. In a device of the class described, a stationary seat adapted to engage the tire when the latter is raised up to it, a movable seat adapted to raise and lower the tire into and out of engagement with the stationary seat, means for guiding the movable seat and links for moving the movable seat.

6. In a device of the class described, a stationary seat adapted to engage the tire when the latter is raised up to it, a movable seat adapted to raise and lower the tire into and out of engagement with the stationary seat, means for guiding the movable seat, and links for moving the movable seat, the movable seat being adapted to be let down sufficiently to disengage the tire when the latter rests upon the ground.

7. In a device of the class described, the combination of a stationary seat for the tire, a movable seat for moving the tire into and out of engagement with the stationary seat, a hand link having a stationary pivot, a second link pivoted to the hand link between the ends of the latter, and a link for arcuately guiding the free end of the movable link.

8. A tire rack adapted to be mounted on a motor vehicle and having a stationary lower rim seat, a movable upper rim seat, a hand link having a fixed pivot at one end and a handle at the opposite end, a second link having said movable seat at its upper end and a pivot at its lower end by which it is pivoted to the hand link between the ends thereof, and a third link having a fixed pivot at one end and at the other end being pivotally attached to the upper end of the second link.

9. A tire rack having a stationary lower rim seat, a movable upper rim seat, a hand link having a fixed pivot at one end and a handle at the opposite end, a second link having said movable seat at its upper end and a pivot at its lower end by which it is pivoted to the hand link between the ends thereof, and a third link having a fixed pivot at one end and at the other end being pivotally attached to the upper end of the second link, the hand link and second link being substantially in alinement when the movable seat is at a sufficient elevation to cause the rim to engage the stationary seat.

10. A tire rack having a stationary lower rim seat, a movable upper rim seat, a hand link having a fixed pivot at one end and a handle at the opposite end, a second link having said movable seat at its upper end and a pivot at its lower end by which it is pivoted to the hand link between the ends thereof, a third link having a fixed pivot at one end and at the other end being pivotally attached to the upper end of the second link, the hand link and second link being substantially in alinement when the movable seat is at a sufficient elevation to cause the rim to engage the stationary seat, and means for locking the hand link and the second link against relative movement when the latter are substantially in alinement.

11. A tire rack having a stationary seat, a movable seat, a pair of links pivotally connected together for moving the movable seat, one of said links being connected to the movable seat and the other having a fixed pivot, and a pair of links articulately connected to the movable seat and diverging therefrom to two points laterally remote, where they are pivoted to fixed pivots for bracing the rack laterally.

12. A tire rack for motor vehicles, having a support for the tire, said support being carried by the vehicle and vertically movable and adapted to descend sufficiently to lower the tire into direct contact with the ground.

13. A tire rack having a plurality of seats, one of which is movable relatively to the other for bringing the tire into and out of engagement with the latter, the movable seat being adapted to descend sufficiently to let the tire down onto the ground.

14. A tire rack for motor vehicles having a seat for the tire, a link work carried by the vehicle and adapted to raise and lower the seat, said link work being adapted to lower said seat to a point where the tire will rest directly upon the ground.

In witness whereof, I have hereunto subscribed my name.

FREDERICK K. LAWRENCE.